(12) United States Patent
Miura et al.

(10) Patent No.: US 6,382,453 B1
(45) Date of Patent: *May 7, 2002

(54) FUEL TANK

(75) Inventors: Katsuyuki Miura, Toyota; Takashi Ishikawa, Okazaki; Teijiro Goto; Takuya Ishikawa, both of Toyota, all of (JP)

(73) Assignees: Toyota Jidosha Kabushiki Kaisha; Horie Kinzoku Kogyo Kabushiki Kaisha, both of Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,984

(22) Filed: Mar. 3, 1999

(30) Foreign Application Priority Data

Mar. 5, 1998 (JP) .......................................... 10-053739

(51) Int. Cl.$^7$ ................................................. B65D 6/12
(52) U.S. Cl. ...................... 220/562; 220/564; 220/722; 220/723; 220/905
(58) Field of Search ............................... 220/720, 721, 220/722, 723, 562, 666, 675, 4.14, 4.15, 62.11, 88.1, 902, 900, 905; 206/218, 522; 229/117.01, 117.03, 117.04, 117.07

(56) References Cited

U.S. PATENT DOCUMENTS

| | | | |
|---|---|---|---|
| 2,378,467 A | | 6/1945 | De Kiss |
| 2,724,418 A | * | 11/1955 | Krupp ..................... 220/720 X |
| 2,930,423 A | * | 3/1960 | Cunningham et al. ........ 222/94 |
| 3,347,406 A | | 10/1967 | Katzenmeyer |
| 3,416,762 A | * | 12/1968 | Headrick ..................... 220/1.5 |
| 3,931,907 A | | 1/1976 | Henle |
| 3,978,901 A | * | 9/1976 | Jones ..................... 220/666 X |
| 4,211,208 A | * | 7/1980 | Lindner ..................... 220/720 X |
| 4,214,721 A | * | 7/1980 | Burhans, Jr. et al. ... 220/666 X |
| 4,557,956 A | * | 12/1985 | Volpert et al. .......... 206/522 X |
| 4,573,508 A | * | 3/1986 | Knaus ................. 220/62.11 X |
| 4,579,139 A | | 4/1986 | Stouffer |
| 4,744,476 A | * | 5/1988 | McKee ..................... 206/218 X |
| 4,865,096 A | * | 9/1989 | Schober et al. ......... 220/666 X |
| 4,875,596 A | * | 10/1989 | Lohse ..................... 220/666 X |
| 4,880,135 A | | 11/1989 | Neou |
| 4,951,699 A | | 8/1990 | Lipman |
| 5,421,383 A | | 6/1995 | Schmid |
| 5,596,971 A | | 1/1997 | Kidokoro |
| 5,692,835 A | * | 12/1997 | Krajeski ..................... 150/900 |
| 5,722,374 A | | 3/1998 | Kidokoro et al. |
| 5,746,185 A | | 5/1998 | Kidokoro et al. |
| 5,746,186 A | | 5/1998 | Kidokoro |

FOREIGN PATENT DOCUMENTS

| | | | | |
|---|---|---|---|---|
| DE | 1486271 | * | 5/1969 | ................. 220/905 |
| IT | 666967 | * | 9/1964 | ................. 220/905 |
| JP | 7132738 A | | 5/1995 | |

* cited by examiner

*Primary Examiner*—Stephen P. Garbe
*Assistant Examiner*—Joseph C Merek
(74) *Attorney, Agent, or Firm*—Kenyon & Kenyon

(57) ABSTRACT

According to the invention, a fuel tank for storing a fuel therein is provided. The fuel tank comprises a pair of spaced deformable thin walls and a deformable connecting wall extending between peripheral edges of the thin walls. The connecting wall and the thin walls define a fuel chamber therein. The thin walls and the connecting wall are connected with each other to cause the connecting wall to expand inwardly when the thin walls expand outwardly.

16 Claims, 15 Drawing Sheets

FUEL TANK

BACKGROUND OF THE INVENTION

1. Field of the Invention

The invention relates to a fuel tank for storing fuel and, in particular, to a fuel tank for an engine.

2. Description of the Related Art

Fuel vapor may be generated if a space is formed above a fuel surface in a fuel tank. Generally, an interior of the fuel tank is in communication with the atmosphere in order to discharge the air above the fuel surface which rises when the fuel is refilled in order to aid the introduction of the fuel into the fuel tank. Thus, the fuel vapor may be discharged from the fuel tank to the atmosphere when the air is discharged from the fuel tank. In the fuel tank disclosed in Japanese Unexamined Patent Publication No. 8-170568, a fuel tank has a fuel chamber which has an interior volume which changes according to the change of the amount of the fuel therein. In this case, the interior volume of the fuel chamber changes according to the change of the amount of the fuel therein so that no space is formed above the fuel surface in the fuel chamber. Therefore, the generation of the fuel vapor is prevented, and it is not necessary to discharge the air above the fuel surface when the fuel is refilled.

The fuel chamber of the fuel tank disclosed in the above publication No. 8-170568 is defined by a sheet which has a bellows portion. The interior volume of the fuel chamber is changed by the stretching or shrinking of the bellows portion of the sheet. When the fuel moves in the fuel chamber, the moving fuel bumps into the bellows portion and the bellows portion is locally extruded. Thus, a load is concentrated on a part of the bellows portion, and then the sheet may be deteriorated or damaged. As described above, the fuel tank may be deteriorated or damaged by a various causes. Therefore, the object of the invention is to provide a fuel tank which can prevent the generation of the fuel vapor and has a high durability.

SUMMARY OF THE INVENTION

According to the invention, a fuel tank for storing a fuel therein is provided, comprising a pair of spaced deformable thin walls and a deformable side wall extending between peripheral edges of the thin walls, the side wall and the thin walls defining a fuel chamber therein, the thin walls and the side wall being connected with each other to cause the side wall to expand inwardly when the thin walls expand outwardly.

Further, when an amount of the fuel in the fuel chamber exceeds a predetermined amount, the thin walls expand outwardly.

Further, when the amount of the fuel in the fuel chamber becomes lower than the predetermined amount, the thin walls expand inwardly, and the side wall expands inwardly due to the expansion of the thin walls.

Further, the thin walls have polygonal shapes, respectively.

Further, the shape of the fuel tank is parallelopiped.

Further, the thin walls have four side edges, respectively, and the side wall has four side sections connected to the side edges, respectively.

Further, corners of two of the side sections together with corners of one of the thin walls form a point.

Further, the side sections expand inwardly simultaneously.

Further, the side sections have rectangular shapes, respectively.

Further, means is provided for stopping the expansion of the thin walls when the thin walls expand outwardly beyond a predetermined extent.

Further, means is provided for preventing the expansion of the side wall when the side wall expands inwardly beyond a predetermined extent.

As recited in claim 3, the connecting wall contracts inwardly not only when the amount of fuel in the fuel tank exceeds the predetermined amount, but also when the amount of fuel in the fuel tank becomes less than the predetermined amount. That is, as the distance between opposite edges of the thin wall decreases both when the thin wall expands outwardly and when the thin wall contracts inwardly, both expansion and contraction of the thin wall pull the edges of the connecting wall inward.

Further, the expansion preventing means comprises projections extending outwardly from the side wall and the projections abut against each other when the side wall expands inwardly beyond the predetermined extent.

Further, one of the thin walls is located above the other thin wall, the lower thin wall has an opening for introducing the fuel into the fuel chamber, and means is provided for introducing the fuel through the opening in a direction along a plane including the lower thin wall.

Further, one of the thin walls is located above the other thin wall, a pipe for introducing the fuel into the fuel chamber is connected to the lower thin wall to form an angle smaller than the right angle between an axis of said pipe and a plane including the lower thin wall.

Further, one of the thin walls is located above the other thin wall, and the lower thin wall has an oval opening for introducing the fuel into the fuel chamber.

Further, one of the thin walls is located above the other thin wall, and the lower thin wall has a plurality of oval openings for introducing the fuel into the fuel chamber.

Further, the rigidity of the side wall is larger than that of the thin walls.

The present invention may be more fully understood from the description of the preferred embodiments of the invention set forth below, together with the accompanying drawings.

DESCRIPTION OF THE PREFERRED EMBODIMENTS

Figure 1:
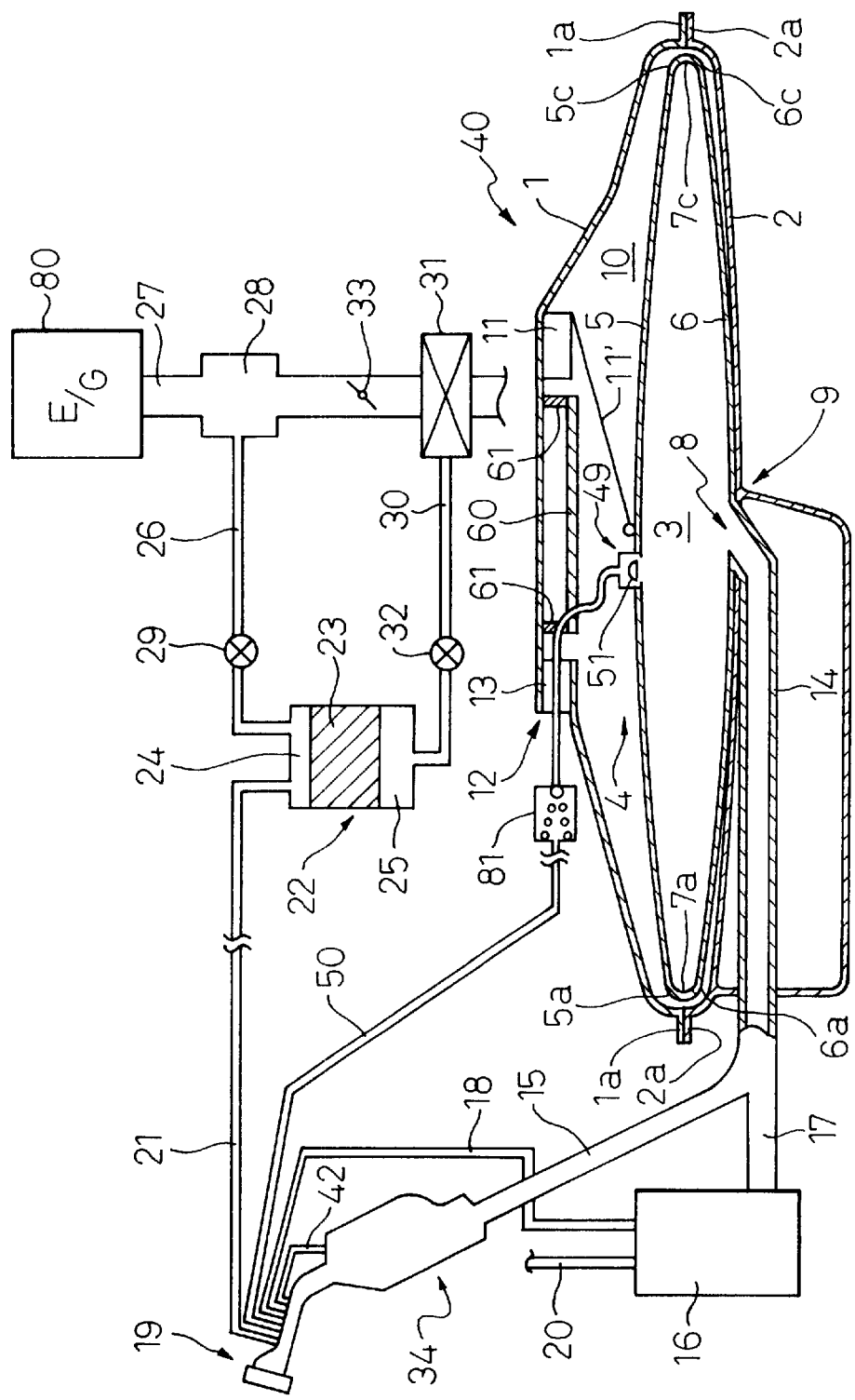
FIG. 1 is a partial cross-sectional view of a fuel tank device of the invention.
Figure 2:
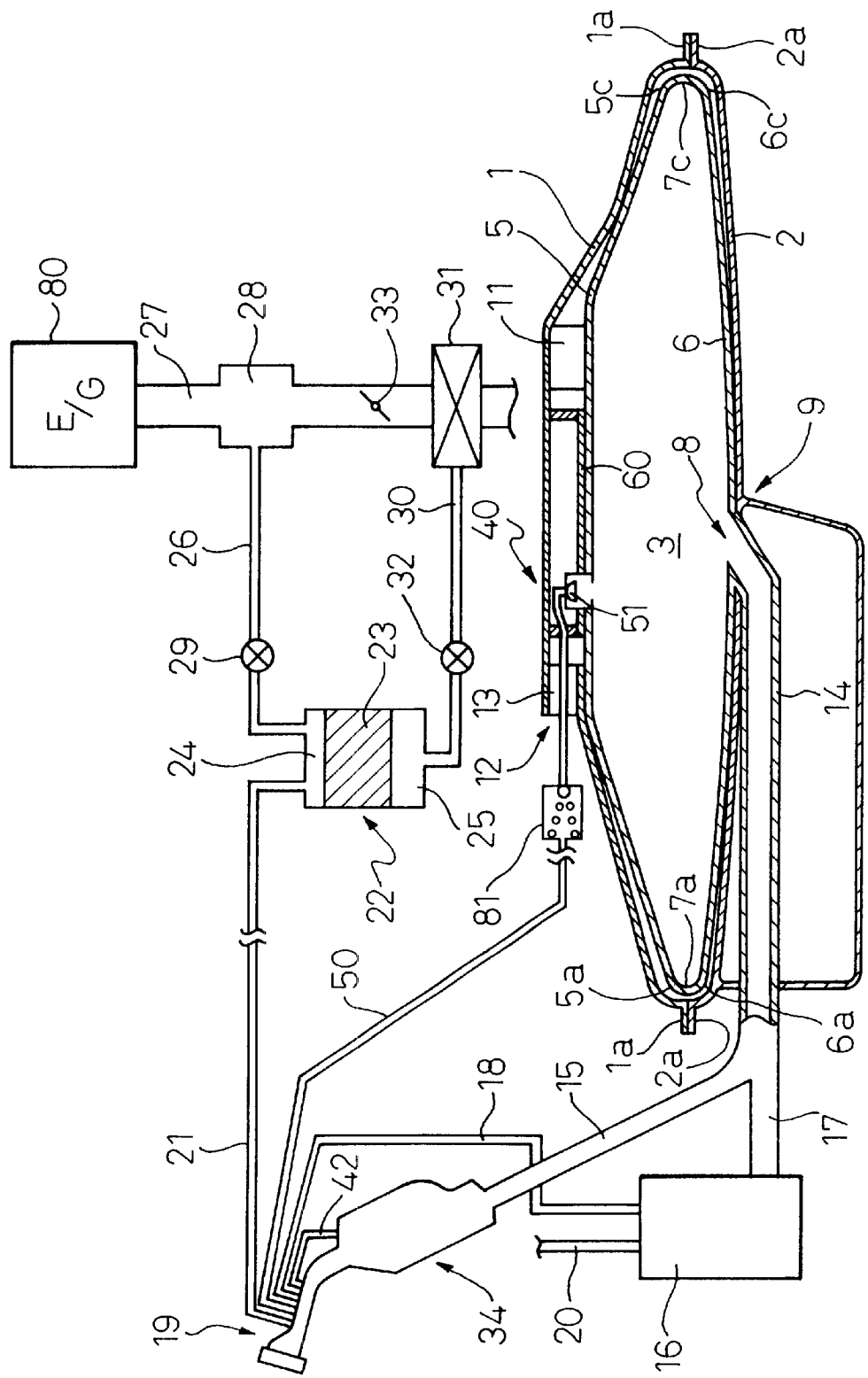
FIG. 2 is a partial cross-sectional view of the fuel tank device of the invention when the fuel container is completely filled with the fuel.

First, the entire structure of the fuel tank device of the invention will be explained. As shown in FIG. 1, the fuel tank device comprises a fuel tank device body 40. The device body 40 is comprised of general cup-shaped upper and lower portions 1 and 2. These portions 1 and 2 are connected to each other at thin flange portions 1a and 2a. A fuel container or fuel tank 4 is roused in the device body 40, which container forms a fuel chamber 3 for storing fuel therein.

Figure 4:
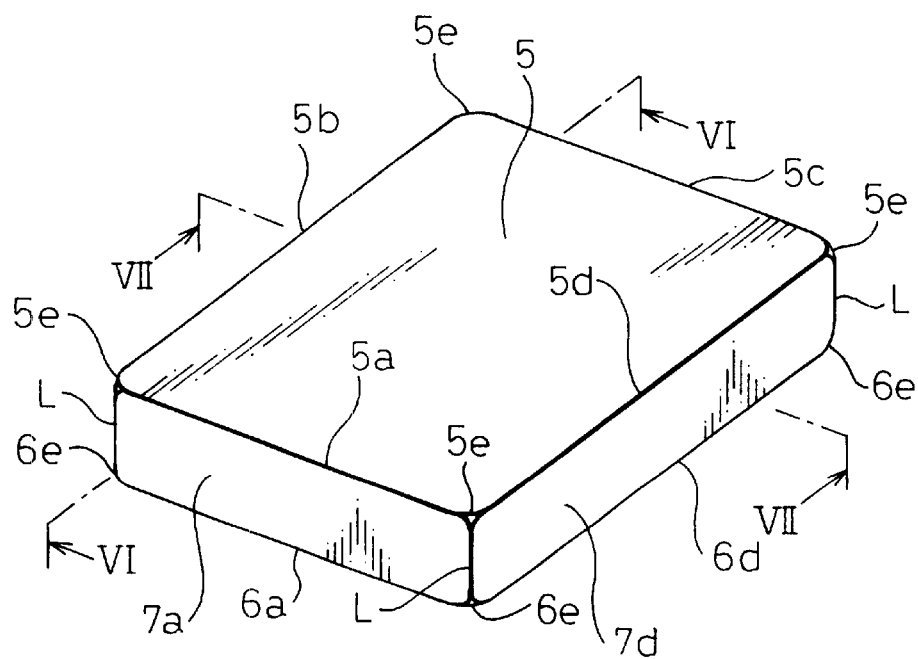
FIG. 4 is a perspective view of the fuel container of the invention.

As shown in FIGS. 1 and 4, the fuel container 4 comprises generally rectangular upper and lower sheet-like or thin walls 5 and 6, which have rigidity but are deformable. Four edges or sides 5a–5d of the upper wall 5 are connected to corresponding edges or sides of the lower wall 6, respectively, by means of side walls or sections 7a–7d, respectively. Therefore, the fuel container 4 is formed by closing a cylindrical annular connecting wall consisting of four side walls 7a–7d by the upper and lower walls 5 and 6. The side walls 7a–7d are generally flat rectangular band-like members which have rigidity but are deformable. Both ends of each side wall 7a–7d are connected to the ends of the adjacent side wall, respectively. In this invention, the fuel container is formed by a pair of thin walls and side walls for connecting these thin walls to each other so that the shape and the structure of the fuel container are simple. Further, the height of the side walls is determined to be less than a predetermined height so that the height of the fuel container is kept low. Therefore, the mountability of the fuel container according to the invention is high.

Figure 13:
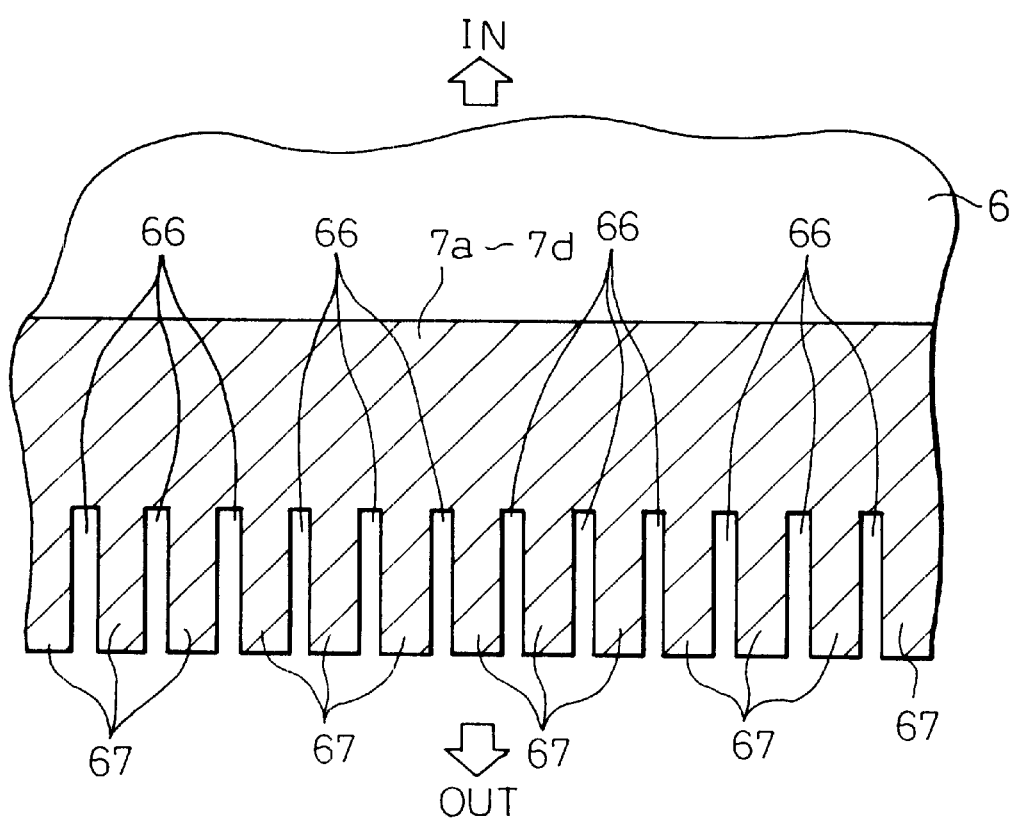
FIG. 13 is a cross-sectional view of side walls of the invention.
Figure 14:
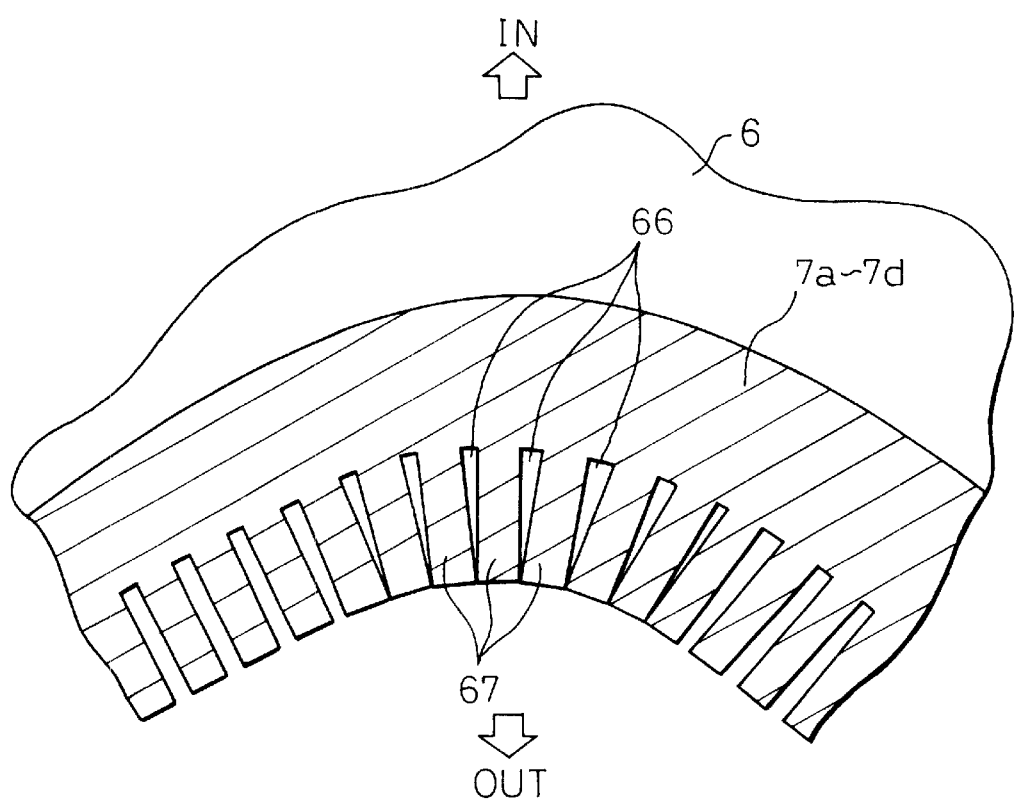
FIG. 14 is a cross-sectional view of the side walls of the invention similar to FIG. 13 when the side walls inwardly expand.

FIGS. 13 and 14 are cross-sectional views of the outer wall face of the side walls 7a–7d, and an arrow IN in the drawings denotes a direction toward an interior of the fuel container 4, and an arrow OUT in the drawings denotes a direction toward an exterior of the fuel container 4. As shown in FIG. 13, grooves are provided in outer wall faces of the side walls 7a–7d. The grooves extend in the direction of the width of the side wall in parallel, and equally spaced away from each other in the direction of the length of the side wall. In other words, projections 67 which are equally spaced apart from each other in the direction of the length of the side wall, are formed in the side wall.

Figure 5:
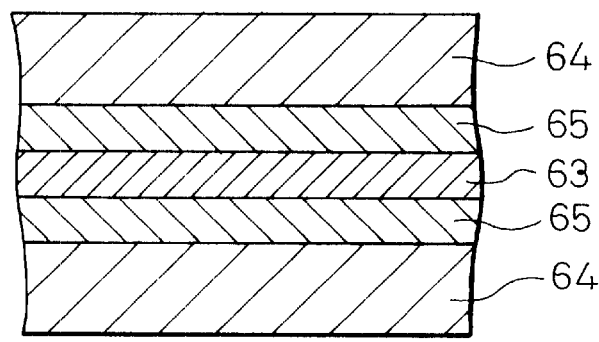
FIG. 5 is a cross-sectional view of upper and lower walls and side walls of the fuel container of the invention.
Figure 6:
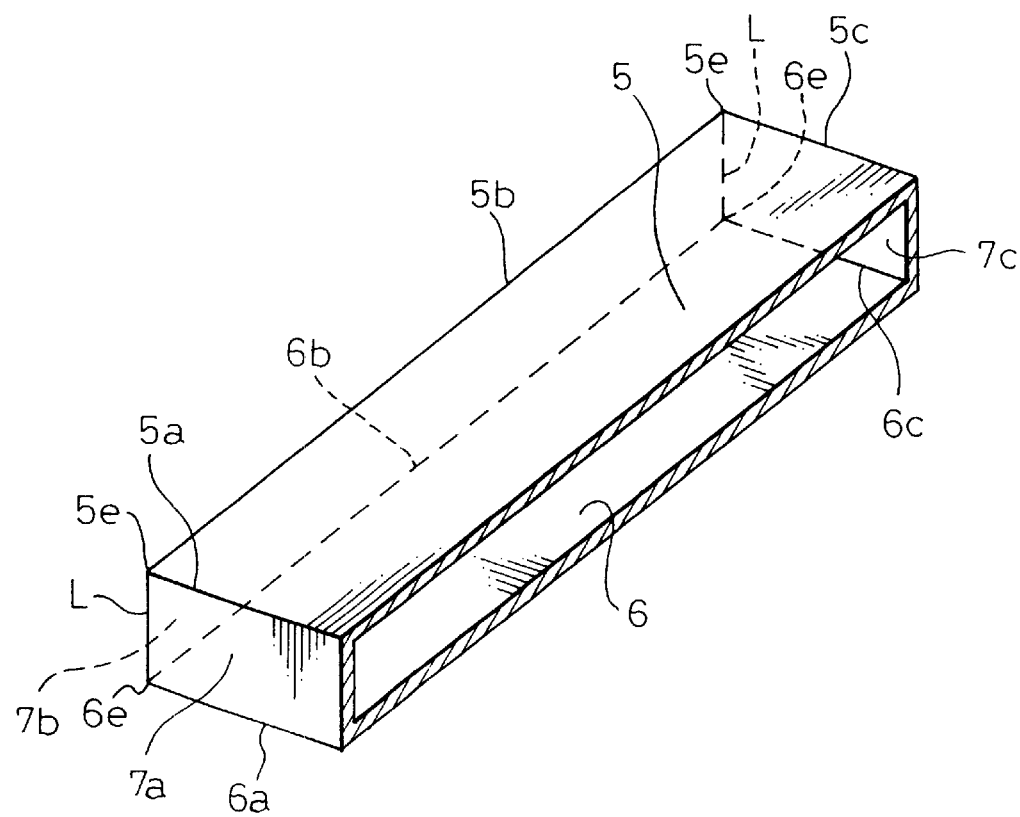
FIG. 6 is a perspective cross-sectional view of the fuel container of the invention along line VI—VI of FIG. 4.
Figure 7:
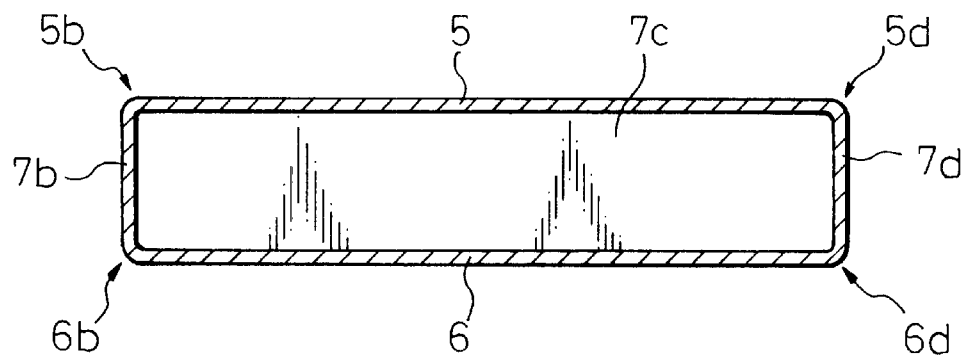
FIG. 7 is a cross-sectional view of the fuel container of the invention along line VII—VII of FIG. 4.

The upper and lower walls 5 and 6, and the side walls 7a–7d have five-layer structure which is formed by bonding surface layers 64 to both side of a core layer 63 by means of a bonding layer 65 (See FIG. 5). The core layer 63 is made of a copolymer resin consisting of an ethylene and a vinyl, or a nylon, and the surface layers 64 are made of a high-density polyethylene. Further, a rigidity per unit area of the side walls 7a–7d according to this embodiment is larger than that of the upper and lower walls 5 and 6.

Figure 8:
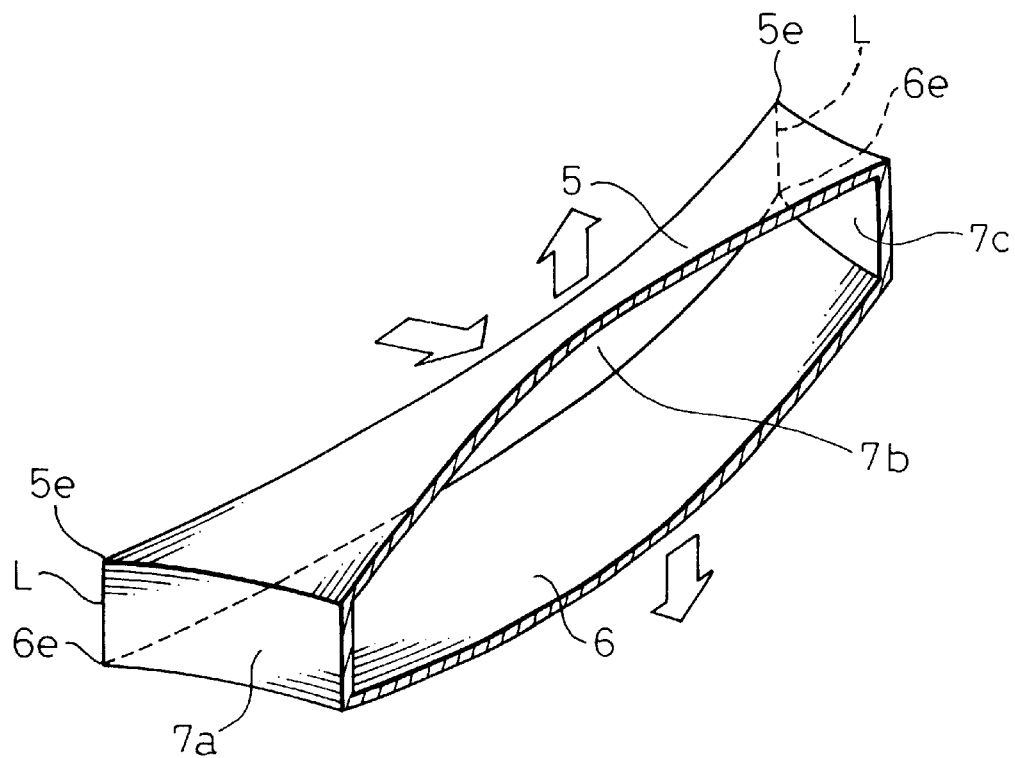
FIG. 8 is a perspective cross-sectional view of the fuel container similar to FIG. 6 when the amount of the fuel in the fuel container is larger than a predetermined amount.

An elliptical opening 8 for introducing and discharging fuel is formed in a central area of the lower wall 6 of the fuel container 4 (See FIG. 8). Further, a connecting pipe opening 9 is formed in a central area of the lower portion 2 of the device body 40. The fuel container 4 is positioned in the device body 40 so that the fuel introducing and discharging opening 8 is aligned with the connecting pipe opening 9.

Figure 3:
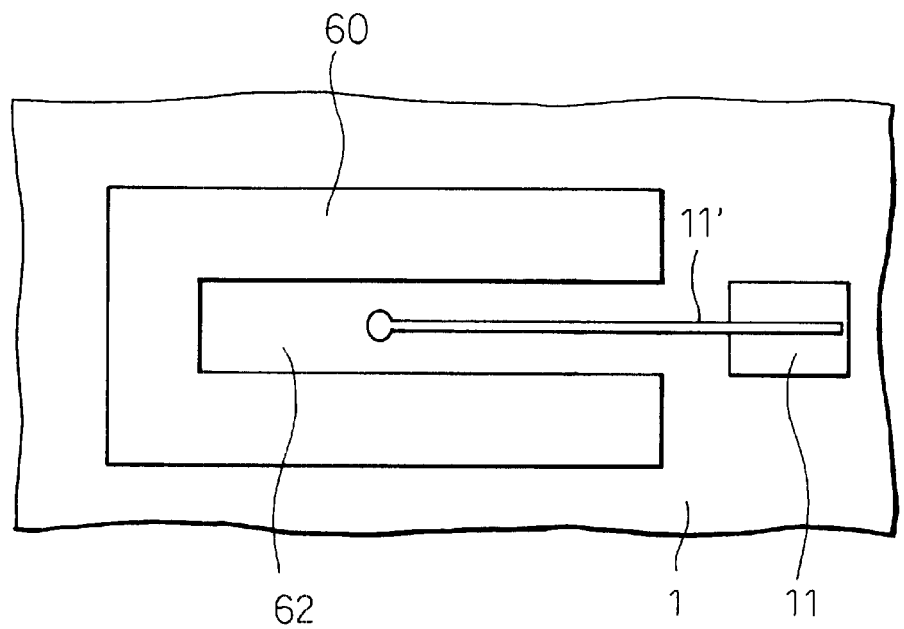
FIG. 3 is a bottom view of a movement restraint plate of the invention.

An air chamber 10 is formed between the fuel container 4 and the device body 40. Further, a fuel amount sensing device 11 for sensing a position or a degree of the movement of the upper wall 5 of the fuel container 4 to calculate an amount of the fuel in the fuel tank device body 40. The sensing device 11 is an arm type sensing device which has an arm 11'. One end of the arm 11' is positioned on the central area of the upper surface of the upper wall 5 of the fuel container 4. The sensing device 11 senses an inclination of the arm 11' as an amount of the fuel in the fuel container 4. Further, the central area of the upper surface of the upper wall 5 which one end of the arm 11' is positioned is moved most largely by the change of the amount of the fuel. Therefore, the sensing device 11 can accurately sense the amount of the fuel in the fuel container 4. Further, a generally flat displacement restraint plate 60 for restraining the displacement of the upper wall 5 of the fuel container 4 is provided on an inner wall surface of the upper portion 1 of the device body 40 by means of a mounting walls 61. As shown in a bottom view of FIG. 3, the restraint plate 60 has a rectangular opening 62 in the central area thereof. The opening 62 is open so that the restraint plate 60 permits the upward movement of the arm 11' when the arm 11' is moved upwardly by the upward movement of the upper wall 5. Further, an opening 12 for introducing and discharging air is formed in the upper portion 1 of the device body 40. Moreover, a filter 13 for preventing objects other than the air from coming into the air chamber 10 from the atmosphere is inserted in the air introducing and discharging opening 12.

Figure 18:
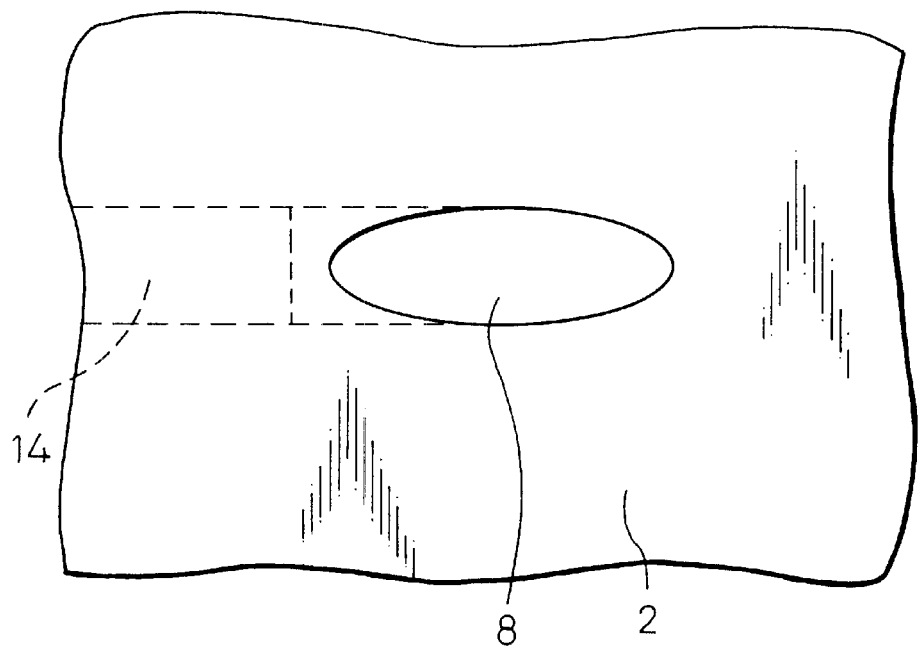
FIG. 18 is a view of a fuel introducing and discharging opening of the invention.

One end of a fueling pipe 14 for introducing the fuel into the fuel container 4 and discharging the fuel from the fuel container 4 is inserted into and connected to the fuel introducing and discharging opening 8 of the fuel container 4 and the connecting pipe opening 9 formed in the lower portion 2 of the device body 40. The fueling pipe 14 is inclined relative to the bottom surface of the lower wall 6 of the fuel container 4. A major axis of the elliptical fuel introducing and discharging opening 8 is generally parallel with a horizontal component of the flow of the fuel into the fuel container 4 (See FIG. 18.). On the other hand, the other end of the fuel pipe 14 is connected to a lower end of a fuel feeding pipe 15 for feeding the fuel into the fuel container 4 and connected to one end of a pipe 17 for introducing the fuel from the fuel container 4 to a fuel pump device 16. Further, the other end of the fuel introducing pipe 17 is connected to the fuel pump device 16.

The fuel pump device 16 pumps the fuel from the fuel container 4 and feeds the fuel to fuel injectors (not shown) of an engine body 80. One end of an in-pump fuel vapor pipe (first fuel vapor pipe) 18 for discharging a fuel vapor from the fuel pump device 16 is connected to the fuel pump device 16. The other end of the in-pump fuel vapor pipe 18 is connected to the fuel feeding pipe 15 in the vicinity of an upper opening 19 of the fuel feeding pipe 15. Further, one end of a fuel conveying pipe 20 for conveying the fuel from the fuel pump device 16 to the fuel injectors is connected to the fuel pump device 16.

One end of an in-container fuel vapor pipe (second fuel vapor pipe) 50 for discharging the fuel vapor from the fuel container 4 is connected to the upper wall 5 of the fuel container 4. The other end of the in-container fuel vapor pipe 50 is connected to the fuel feeding pipe 15 upstream of the in-pump fuel vapor pipe 18 in the vicinity of the upper opening 19 of the fuel feeding pipe 15. Further, a fuel vapor pipe shut-off valve 49 is provided in the above one end of the in-container fuel vapor pipe 50. The shut-off valve 49 has a float 51 which has a density smaller than that of the fuel. Further, the shut-off valve 49 is provided on the upper wall 5 of the fuel container 4, and the float 51 is lowered to communicate the interior of the fuel container 4 with the in-container fuel vapor pipe 50 when the fuel vapor or the air exists in the upper area of the fuel container 4. On the other hand, the float is raised by the fuel surface in the fuel container 4 to shut the fuel container 4 from the in-container fuel vapor pipe 50 when the fuel vapor or the air is discharged from the fuel container 4 and the interior of the fuel container 4 is completely filled with the fuel. Further, a check valve 81 is provided in the in-container fuel vapor pipe 50. The check valve 81 is opened when a pressure in the in-container fuel vapor pipe 50 between the check valve 81 and the shut-off valve 49 exceeds a predetermined positive value, and is closed when the pressure is lower than the predetermined positive value.

One end of an in-feeding-pipe fuel vapor pipe (third fuel vapor pipe) 21 for discharging the fuel vapor from the space in the vicinity of the upper opening 19 is connected to the fuel feeding pipe 15 between the above other end of the in-pump fuel vapor pipe 18 and the upper opening 19. The other end of the in-feeding-pipe fuel vapor pipe 21 is connected to a charcoal canister 22 for adsorbing the fuel vapor thereon and temporarily storing the fuel vapor therein.

An activated carbon 23 for adsorbing the fuel vapor thereon is positioned in the charcoal canister 22. Therefore, an interior of the charcoal canister 22 is divided by the activated carbon 23. Thus, a fuel vapor chamber 24 is formed at one side of the activated carbon 23, and an air chamber 25 is formed at the other side of the activated carbon 23. The above other end of the in-feeding-pipe fuel vapor pipe 21 is connected to the fuel vapor chamber 24 of the charcoal canister 22. Further, one end of an in-canister fuel vapor pipe or fuel vapor introducing pipe (fourth fuel vapor pipe) 26 for discharging the fuel vapor adsorbed on the activated carbon 23 from the canister 22 to an intake passage 27 is connected to the fuel vapor chamber 24. The other end of the in-canister fuel vapor pipe 26 is connected to a surge tank 28 of the intake passage 27.

A fuel vapor amount control valve 29 for shutting the in-canister fuel vapor pipe 26 is provided in the in-canister fuel vapor pipe 26. One end of an air pipe 30 for introducing the air into the air chamber 25 of the canister 22 is connected to the air chamber 25. The other end of the air pipe 30 is connected to an air cleaner 31 provided in the intake passage 27. A shut-off valve 32 for opening and closing the air pipe 30 is provided in the air pipe 30. Further, a throttle valve 33 for controlling an amount of the air to be introduced into the engine body 80 is provided in the intake passage 27.

According to the invention, the fuel vapor amount control valve 29 is opened when the fuel vapor should be introduced from the charcoal canister 22 into the intake passage 27. It should be noted that the control valve 29 is normally opened. Therefore, when the control valve 29 is opened, a negative pressure in the surge tank 28 is introduced into the charcoal canister 22 via the in-canister fuel vapor pipe 26 and the air in the air cleaner 31 is introduced into the canister 22 via the air pipe 30. Therefore, the fuel vapor is introduced from the canister 22 into the intake passage 27. It should be noted that the control valve 29 is controlled on the basis of the engine driving condition such as the amount of the intake air, the engine speed, and the engine load to introduce the amount of the fuel vapor into the intake passage 27 in order to obtain a desirable air-fuel ratio. Therefore, the control valve 29 serves as means for controlling the amount of the fuel vapor discharged into the intake passage 27, and the shut-off valve 32 serves as means for controlling the introduction of the air into the charcoal canister 22.

Further, according to the invention, the negative pressure is introduced into the fueling system between the canister 22 and the fuel tank device body 40 when the leakage in the fueling system which is in communication with the charcoal canister 22 should be detected, and thereafter, the control and shut-off valves 29 and 32 are closed. Thus, the fueling system which is in communication with the canister 22 is closed. After the fueling system is closed, it is judged that there is a leakage in the fueling system when a pressure sensor not shown senses that the pressure in the fueling system raises toward the atmosphere pressure. Therefore, the control and shut-off valves 29 and 32 serves as means for detecting the leakage of the fuel vapor.

An action of the fuel tank device of the invention when the fuel is introduced into the fuel container will be explained. The fuel is introduced into the fuel container 4 via the fuel feeding and fueling pipes 15 and 14 when the fuel is refilled. According to the invention, the fueling pipe 14 is inclined relative to the lower wall 6 of the fuel container 4 so that the fuel is introduced into the fuel container 4 generally in parallel with the upper and lower walls 5 and 6. Therefore, the fueling pipe of this embodiment corresponds to means for maintaining the direction of the flow of the fuel into the fuel container. Thus, the strong bumping of the fuel into the upper wall 5 is prevented when the fuel is introduced from the fueling pipe 14 into the fuel container 4. Further, it is ensured that the rate of the flow of the fuel into the fuel container 4 is more accurately maintained at a predetermined rate than that in case that the fuel is introduced from the upper wall 5 of the fuel container 4. Thus, the fueling pipe of this embodiment corresponds to means for adjusting the rate of the inflow of the fuel. Therefore, the deterioration of or damage to the fuel container or tank is prevented. Thus, the fueling pipe of this embodiment corresponds to means for preventing the deterioration of the fuel tank.

When the fuel is refilled and there is an air or a fuel vapor in the fuel container 4, the air or the fuel vapor in a space above the fuel surface is discharged into the in-container fuel vapor pipe 50 by the upward movement of the fuel surface in the fuel container 4 derived from the increase of the amount of the fuel in the fuel container 4. Therefore, the check valve 81 is opened and then the air or the fuel vapor is discharged from the fuel container 4 to the fuel feeding pipe 15. When the fuel is further introduced into the fuel container 4 and the container 4 is completely filled with the fuel, the air or the fuel vapor is completely discharged from the fuel container 4 to the charcoal canister 22 via the in-container and in-refueling fuel vapor pipes 50 and 21. When the fuel surface reaches the fuel vapor pipe shut-off value 49 by completely discharging the fuel vapor or the air from the fuel container 4, the shut-off valve 49 shuts the in-container fuel vapor pipe 50. Therefore, the leakage of the fuel into the in-container fuel vapor pipe 50 is prevented. Further, at this time, the check valve 81 is closed. After the check valve 81 is once closed, the air does not flow into the fuel container 4 via the in-container fuel vapor pipe 50. Thus, the fuel container 4 is maintained liquid-tight as long as fuel vapor is not generated in the fuel container 4.

Figure 9:
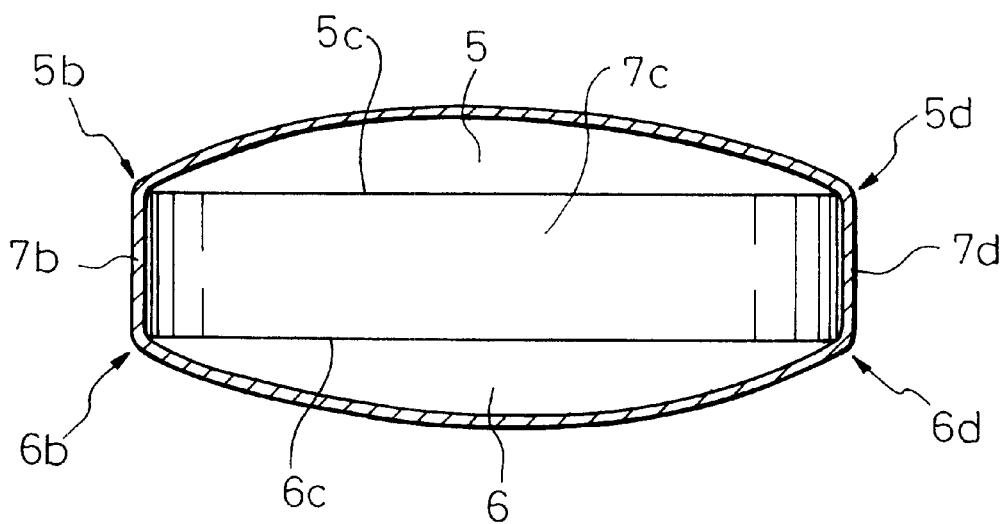
FIG. 9 is a cross-sectional view of the fuel container of the invention similar to FIG. 7 when the amount of the fuel in the fuel container is larger than the predetermined amount.

The rigidity of the upper and lower walls 5 and 6 per unit area is smaller than that of the side walls 7a–7d. Therefore, when the amount of the fuel in the fuel container 4 is increased, and exceeds a certain amount (hereinafter, referring to as "a predetermined amount") of the fuel which the fuel container 4 can accommodate therein in the form of its rectangular parallelepiped, the upper and lower walls 5 and 6, not the side walls 7a–7d expand outwardly, respectively (See FIGS. 8, 9 and 10.). It should be noted that the fuel pipe 14 of the invention is connected to the lower wall 6 so that the fuel pipe 14 does not prevent the upper wall 5 from expanding. Further, according to the invention, the fuel pipe 14 is connected to the central portion of the lower wall 6, and the relationship between the positions of the central portion of the lower wall 6 and the lower portion 2 of the fuel tank device body 40 does not change. Therefore, fuel pipe 14 does not prevent the lower wall 6 from expanding. Of course, the degree of the expansion of the lower wall 6 is smaller than that of the upper wall 5. Further, the degree of the expansion of the central portion of the upper wall 5 is largest in the upper wall 5.

Figure 10:
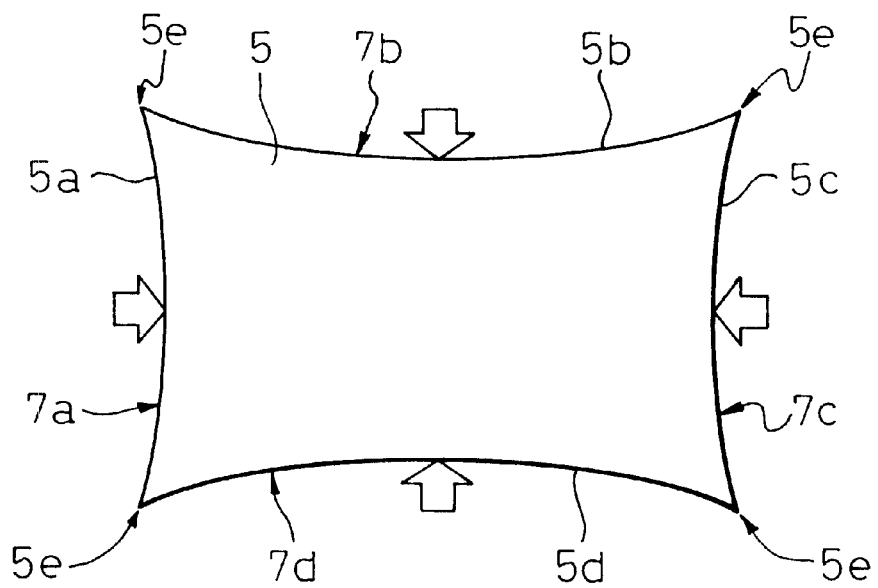
FIG. 10 is a plan view of the fuel container of the invention when the amount of the fuel in the fuel tank is larger than the predetermined amount.

When the upper and lower walls 5 and 6 outwardly expand, the side walls 7a–7d are pulled inwardly and are curved or expand inwardly (See FIGS. 8 and 10.). According to this embodiment, the projections 67 are formed in the outer wall faces of the side walls 7a–7d. Therefore, when the side walls 7a–7d inwardly expand to a predetermined extent, these projections abut (See FIG. 14). Thus, the further expansion of the side walls 7a–7d is prevented. Consequently, the amounts of the expansion of the upper and lower walls 5 and 6 are limited. Thus, the projection of this embodiment serves as means for controlling the expansion of the side walls or means for limiting the amount of the expansion. Thus, the side walls 7a–7d do not inwardly expand to an extent larger than the predetermined extent so that a load acting on the side walls 7a–7d is maintained under a predetermined value. Therefore, damage to the side walls 7a–7d is prevented.

Figure 15:
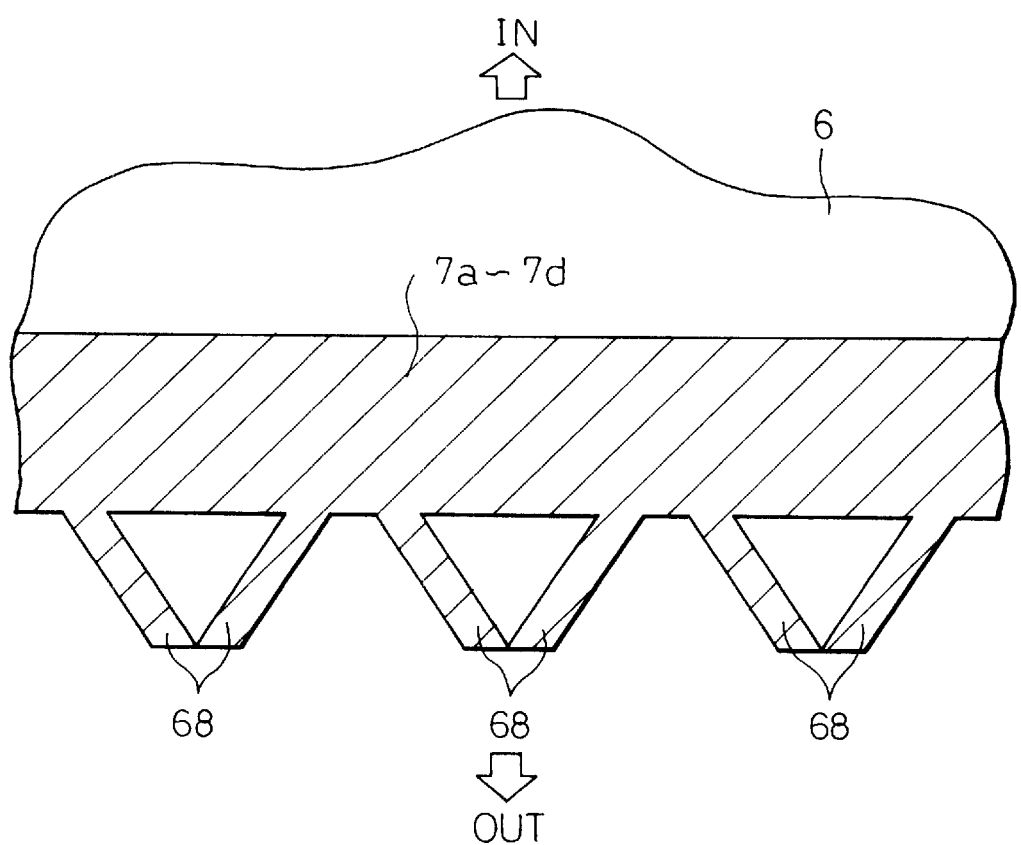
FIG. 15 is a cross-sectional view of side walls of another embodiment.
Figure 16:
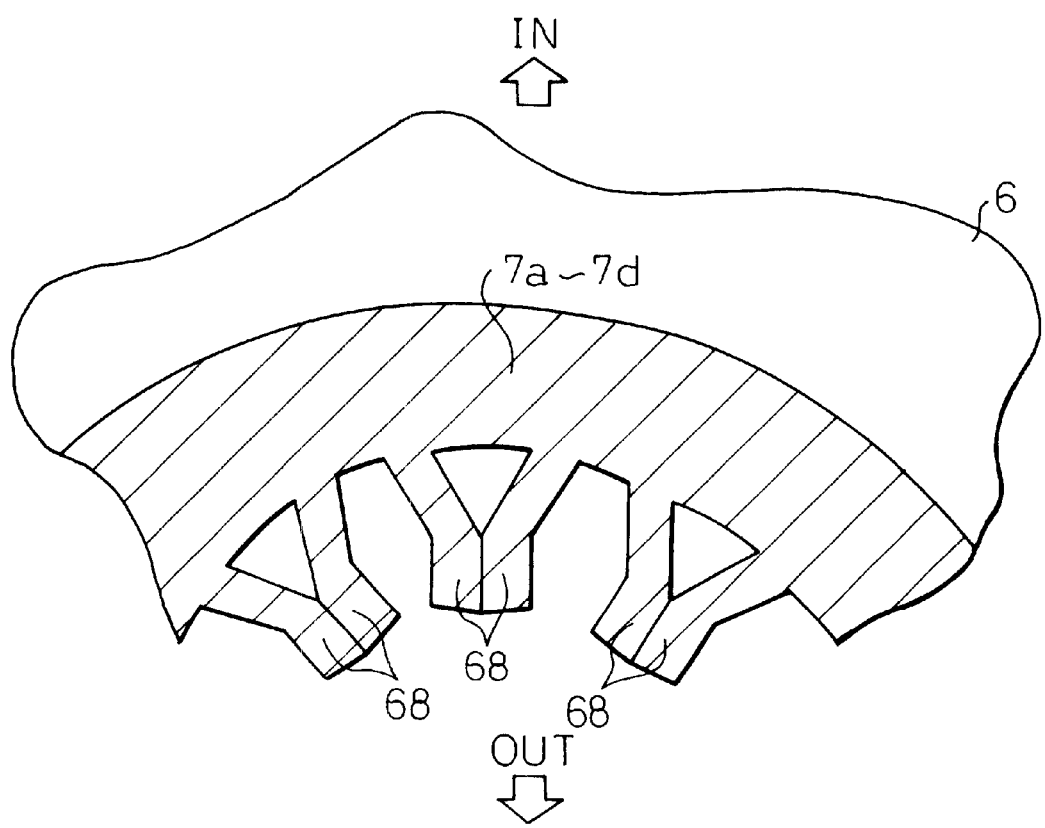
FIG. 16 is a cross-sectional view of the side walls of another embodiment similar to FIG. 15 when the side walls inwardly expand.

It should be noted that the invention is not limited to the above projections, but plurality pairs of projections 68, which abut when the fuel container 4 is in the form of the rectangular parallelopiped, may be formed in the side walls 7a–7d (See FIG. 15.). In this case, the contacting area between a pair of the projections 68 is increased, according to the increase of the degree of the inward expansion of the side walls 7a–7d (See FIG. 16.). Consequently, the force which prevents the inward expansion of the side walls 7a–7d is increased, according to the increase in the contacting area between the projections 38. Thus, the inward expansion of the side walls is prevented by the preventing force which is gradually increased according to the increase of the degree of the inward expansion of the side walls. Therefore, the projections of this embodiment correspond to means for controlling the inward expansion of the side walls.

Figure 17:
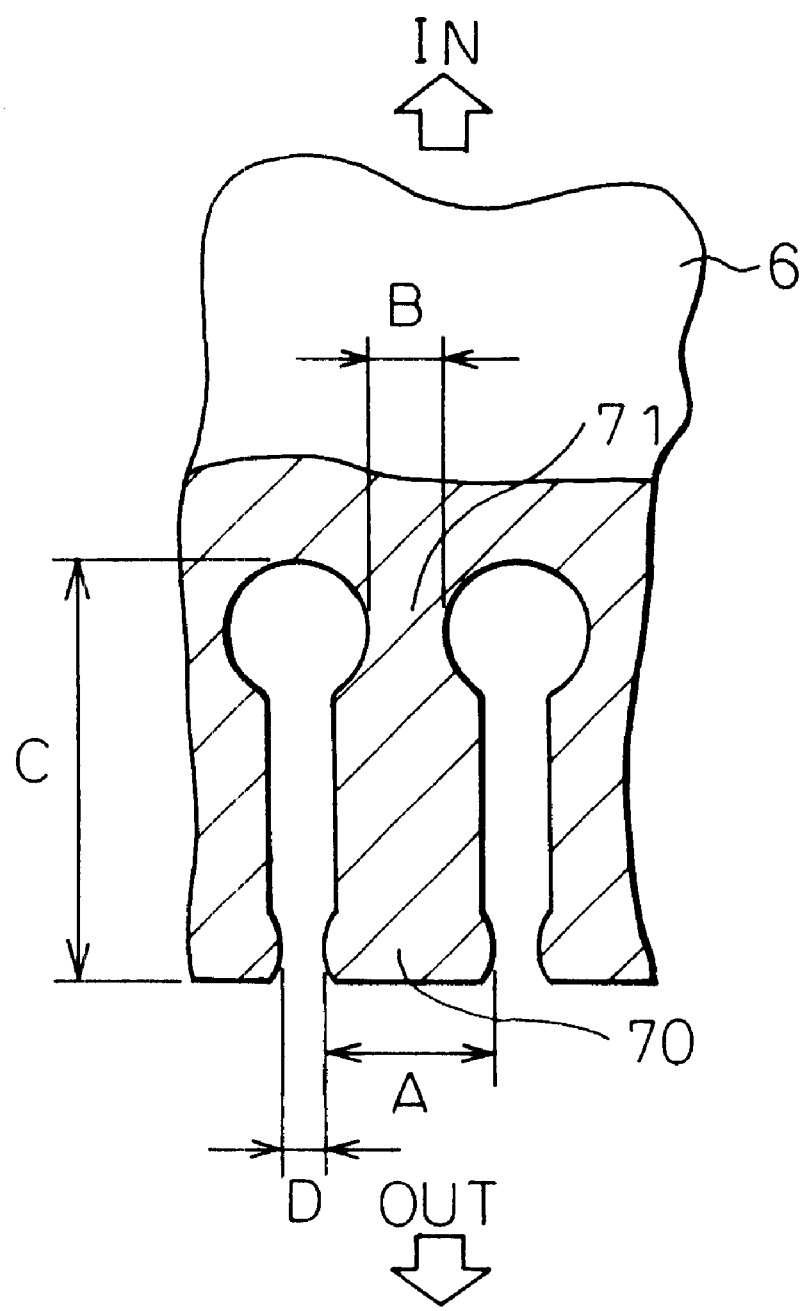
FIG. 17 is a cross-sectional view of side walls of further another embodiment.

Further, as shown in FIG. 17, a portion 70 of the projection 68 which initially abuts may have a relatively larger width A, and a root portion 71 of the projection 69 may have a relatively smaller width B. Further, the portion 70 of the projection 69 may have a width larger than the width A in order to prevent the inward expansion of the side walls in case that the side walls are damaged since the side walls can largely inwardly expand. Further, when the inward expansion of a portion of the side walls, which can be largely extruded, is prevented, the inward expansion of a portion of the side walls which cannot largely expand should be enhanced in order to maintain the degree of the outward and inward expansions of the upper and lower walls larger than a predetermined value. To enhance the inward expansion of the portion of the side walls which cannot largely expand, the projections may have a relatively long length C and a relatively large distance D between the projections.

As described above, any shape of the projection or groove can be suitably selected to obtain a desirable expansion of the upper and lower walls and the side wall.

According to the invention, the rectangular upper wall 5 expands around the vertex (corner) 5e of the upper wall 5 serving as a reference point. Similarly, the lower wall 6 expands around the vertex (corner) 6e of the lower wall 6 serving as a reference point. Therefore, the degree of the expansion of the central portions of the upper and lower walls 5 and 6 are largest. On the other hand, the displacement of the central portion of the side wall relative to the central portions of the upper and lower walls 5 and 6 is largest. Further, the portion which the side walls are connected each other, i.e., the line L connecting the vertex 5e of the upper wall 5 and the vertex 6e of the lower wall 6 corresponding to the vertex 5e is not displaced relative to the central portions of the upper and lower walls 5 and 6. Therefore, when the upper and lower walls 5 and 6 outwardly expand tension is concentrated on a diagonal line connecting the vertexes of the upper wall 5 and a diagonal line connecting the vertexes of the lower wall 6. Therefore, it is preferable that the shapes of the upper and lower walls 5 and 6 have diagonal lines as long as possible, which diagonal lines are generally equal, taking account of the space of the fuel tank device body which can accommodate the fuel container, when the polygonal shapes of the upper and lower walls 5 and 6 other than the rectangular shape is employed. Thus, the tension generated in the upper and lower walls 5 and 6 is dispersed over the entire of the upper and lower walls by changing the shapes of the upper and lower walls 5 and 6 as described above. Alternatively, the fuel container may be formed by directly connecting edges of the upper and lower walls to each other without using the side wall. It should be noted that any shape having curves can be employed as the shapes of the upper and lower walls as far as the shape has a corner as the reference point.

Further, it is preferable that the rigidity of the side walls 7a–7d, and the upper and lower walls 5 and 6 is determined so that an angle formed between the surfaces of the upper or lower wall on the either side of the diagonal line is larger than that formed between the side wall adjacent to each other when the upper and lower walls outwardly expand.

Further, as described above, the degree of the expansion of the upper wall 5 of the fuel container 4 is larger than that of the lower wall 6 of the fuel container 4. Moreover, the displacement of a portion of the end of the side wall on the side of the upper wall is substantially the same as that on the side of the lower wall. Consequently, the side walls 7a–7d are twisted when the side walls expand. Therefore, it is advantageous that the projections are formed so that a portion of the side wall connected to the upper wall 5 which largely expands, can be early abut in order to prevent the twisting of the side walls 7a–7d.

Further, the fuel intends to move in the fuel container 4 when the container 4 is inclined. However, the fuel container 4 of the invention is formed by the upper and lower walls 5 and 6 and the side walls 7a–7d which have a relatively rigidity so that the movement of the fuel in the fuel container 4 is prevented. Therefore, no load is generated in the walls of the fuel container 4 by the movement of the fuel. Further, even if the load is locally generated, there is a small possibility that the fuel container is deteriorated or damaged since the fuel container is formed of a material having a relatively large rigidity and the upper and lower walls have polygonal shape to uniformly disperse the load, which tends to concentrate on a local portion, to several portions (such as the reference points and the diagonal lines of the upper and lower walls).

The interior volume of the air chamber 10 is decreased when the upper and lower walls 5 and 6 of the fuel container 4 outwardly expand. Then, the air is introduced or discharged through the air introducing and discharging opening 12. Therefore, the upper and lower walls 5 and 6 easily expand.

When the fuel is further introduced into the fuel container 4, the upper wall 5 of the fuel container 4 abuts against the upper portion 1 of the fuel tank device body 40 and the movement restraint plate 60, and the lower wall 6 of the fuel container 4 abuts against the lower portion 2 of the fuel tank device body 40. When the upper and lower walls 5 and 6 of the fuel container 4 abut, the fuel container 4 cannot outwardly expand any more, and therefore, the introduction of the fuel into the fuel container 4 is stopped. Therefore, an amount of the fuel larger than an amount which the fuel container 4 can accommodate, is prevented from being introduced into the fuel container 4, so that the degree of the expansion of the fuel container does not exceed the maximum value which the fuel container can permit. Thus, the movement restraint plate of this embodiment corresponds to means for controlling the expansion of the sheet wall.

Figure 19:
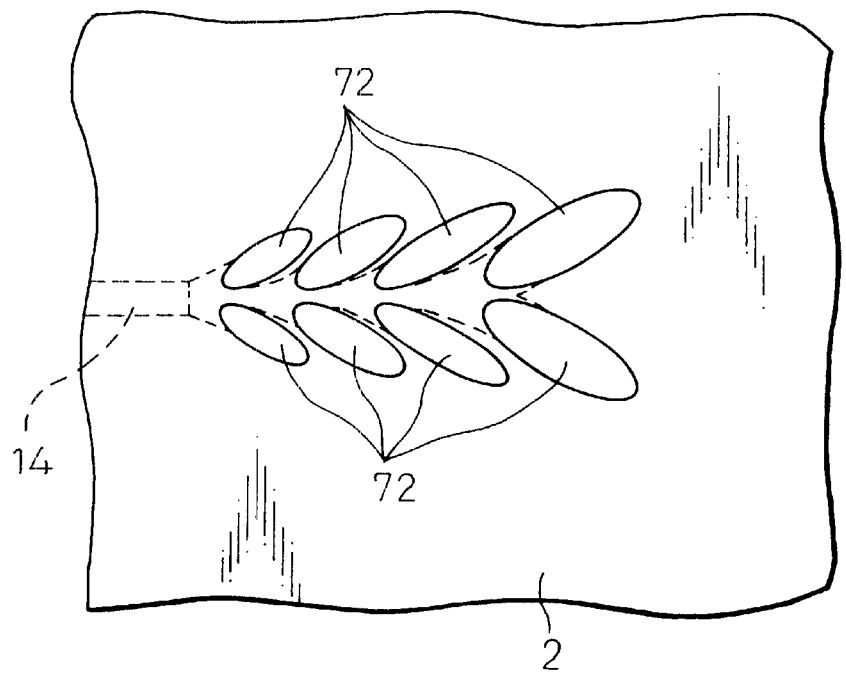
FIG. 19 is a view of a fuel introducing and discharging opening of another embodiment of the invention.
Figure 20:
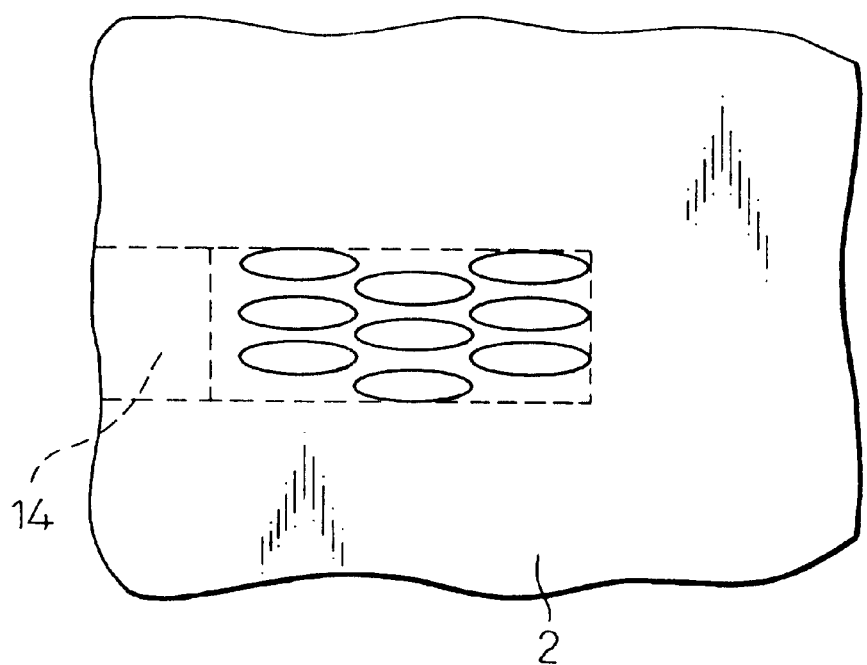
FIG. 20 is a view of a fuel introducing and discharging opening of further another embodiment of the invention.
Figure 21:
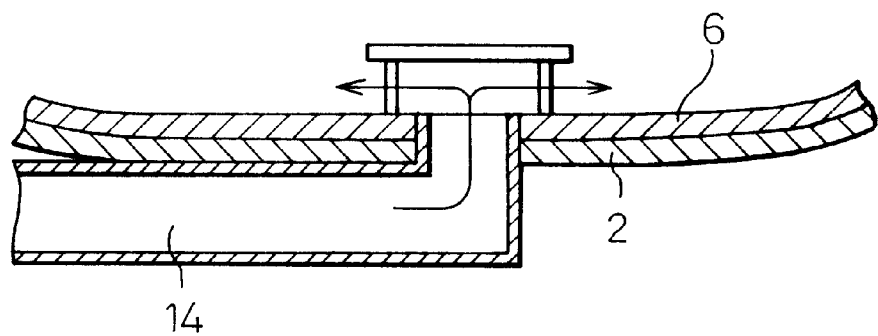
FIG. 21 is a view of plate for changing a direction of a flow of a fuel of the invention.

Alternatively, instead of the fuel introducing and discharging opening 8, a plurality of oval openings 72 which are directed in different directions, may be formed side by side in the lower wall 6 of the fuel container 4 (See FIG. 19.). In this case, a plurality of the branch pipes divided from the fuel pipe 14 are connected to the oval openings 72, respectively. Further, instead of the fuel introducing and discharging opening 8, a plurality of the oval openings 73 which are directed in parallel, may be formed in the lower wall 6 of the fuel container 4 (See FIG. 20). Further, alternatively, instead of the fuel pipe 14 being connected in an inclined manner relative to the lower wall 6 of the fuel container 4, the fuel pipe 14 may be connected to the lower wall 6 of the fuel container 4, generally perpendicular to the lower wall 6. In this case, a plate 74 for changing the direction of the flow of the fuel is mounted on the lower wall 6 of the fuel container 4 in parallel with the lower wall 6 so that the plate 74 covers the fuel introducing and discharging opening 8 at a predetermined position above the opening 8 (See FIG. 21.). The plate 74 changes the direction of the fuel which is introduced into the fuel container 4, perpendicular to the lower wall 6 of the fuel container 4, to the direction which is parallel with the lower wall 6 of the fuel container 4. Thus, the plate 74 corresponds to means for maintaining the direction of the flow of the fuel. It should be noted that the plate 74 is positioned at a position lower than the width, i.e., height of the side walls 7a–7d.

Figure 11:
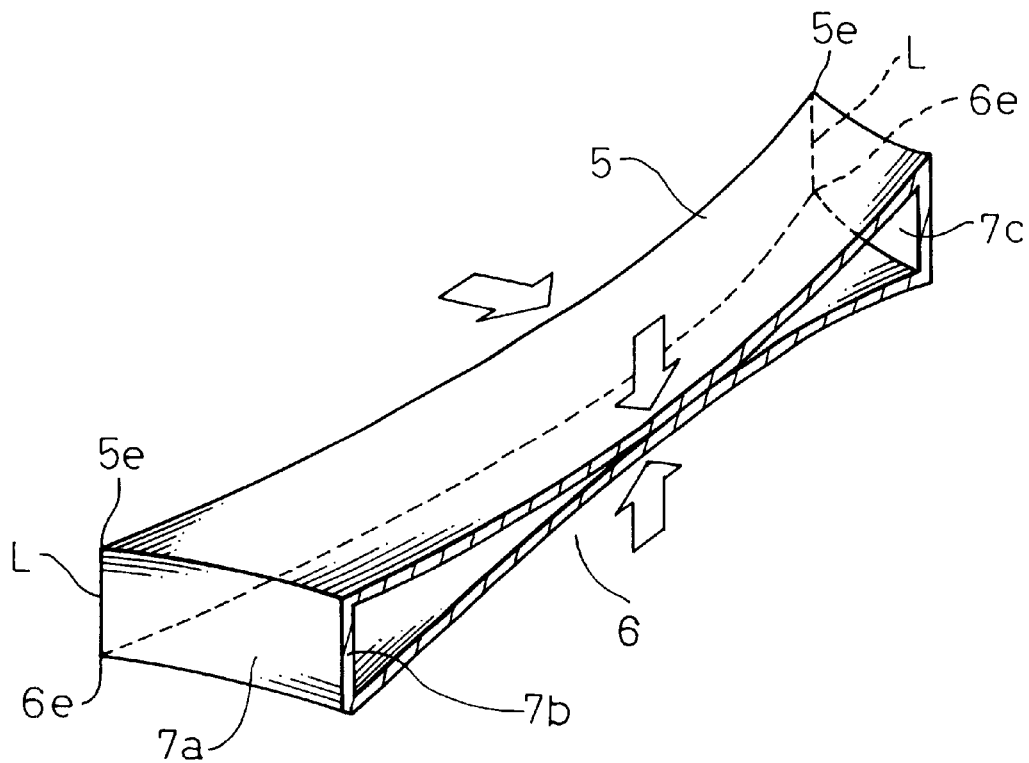
FIG. 11 is a cross-sectional view of the fuel container of the invention similar to FIG. 6 when the amount of the fuel in the fuel container is smaller than the predetermined amount.
Figure 12:
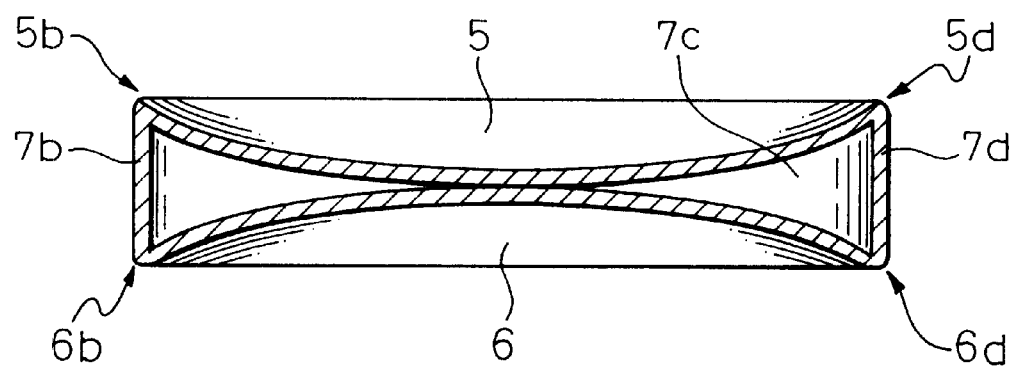
FIG. 12 is a cross-sectional view of the fuel container of the invention similar to FIG. 7 when the amount of the fuel in the fuel container is smaller than the predetermined amount.

An action of the fuel tank of the invention when the engine is driven will be explained. The fuel pump device 16 is operated when the engine is driven. The fuel pump device 16 pumps the fuel from the fuel container 4 through the fuel and fuel introducing pipes 14 and 17. According to the invention, the fuel pipe 14 is connected to the lower portion 2 of the fuel tank device body 40 and the lower wall 6 of the fuel container 4. Therefore, the fuel is easily pumped from the fuel container 4 even if an extremely small amount of fuel remains in the fuel container 4. When the amount of the fuel in the fuel container 4 is decreased, the outwardly expanding upper and lower walls 5 and 6 and the inwardly expanding side walls 7a–7d return to their original shape. Further, as shown in FIGS. 11 and 12, when the amount of the fuel in the fuel container 4 becomes smaller than the predetermined amount by pumping the fuel from the fuel container 4, the upper and lower walls 5 and 6 inwardly expand. Also, the side walls 7a–7d inwardly expand. When the fuel is pumped from the fuel container 4, the check valve is closed and the fuel surface in the fuel container 4 reaches the shut-off valve 49. Therefore, no space is formed above the fuel surface in the fuel container 4. Thus, the interior of the fuel container 4 is always maintained liquid-tight so that the generation of fuel vapor in the fuel container 4 is prevented.

Figure 22:
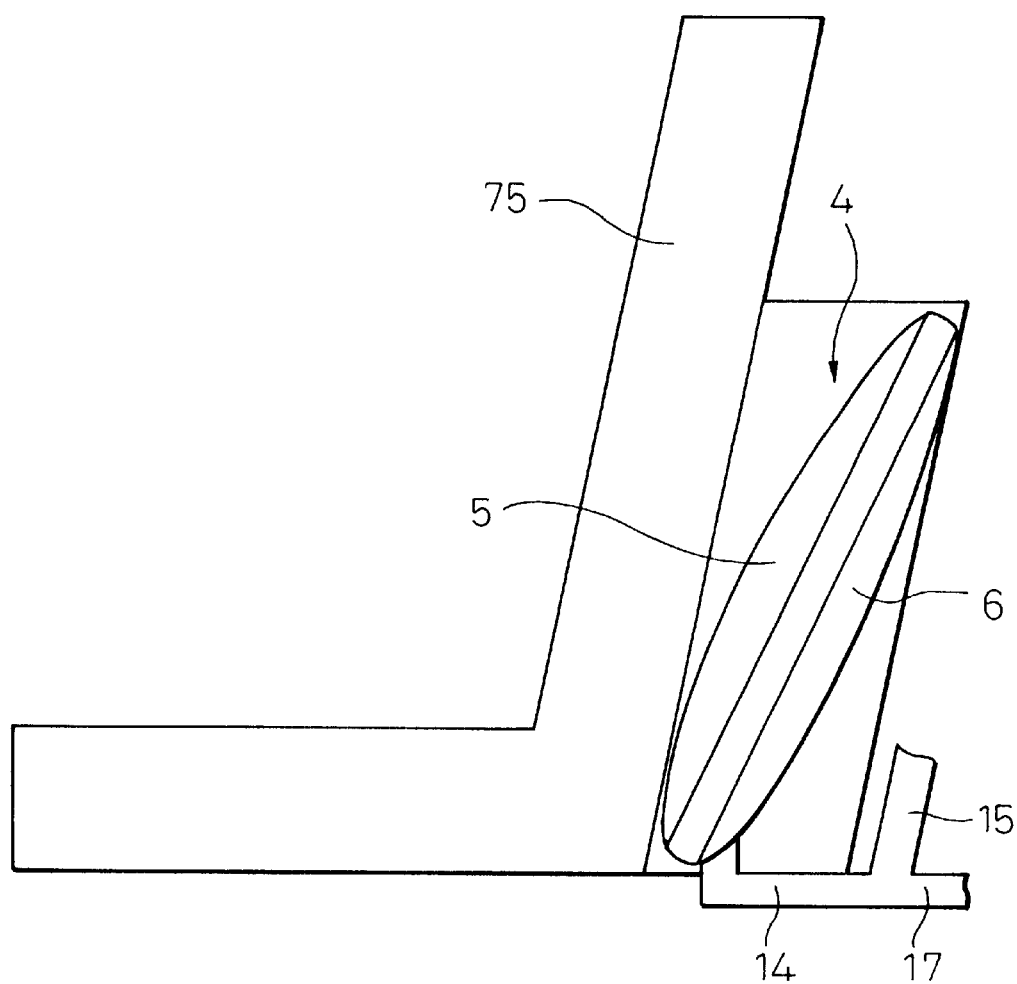
FIG. 22 is a view showing another manner of mounting the fuel container.

Alternatively, though the fuel container is positioned in such a manner that the upper and lower walls 5 and 6 are horizontal according to the embodiment of the invention, the fuel container 4 may be positioned in such a manner that the upper and lower walls are inclined to the horizon in case that the fuel container 4 should be housed in the elongated space behind the seat 75 of the vehicle (See FIG. 22.). In this case, it is preferable that the fuel introducing and discharging opening is formed in the lower wall located at the lowest position of the fuel container.

Further, the fuel container of this embodiment can be used as an air chamber of the fuel tank device. Moreover, the fuel container of this embodiment can be simply used as a fuel tank for storing fuel.

What is claimed is:

1. A fuel tank for storing fuel therein, comprising:
   opposed deformable thin walls; and
   at least one deformable connecting wall for interconnecting the thin walls to form an interior therebetween for storing fuel, the interior of the tank storing a predetermined amount of fuel when the thin walls and the connecting wall are under a non-deformed condition,
   wherein the connecting wall has a height, and the thin walls deform to be curved outwardly and the connecting wall deforms to be curved inwardly when the interior of the tank stores an amount of the fuel larger than the predetermined amount, and wherein preventing means is provided for preventing the deformation of said thin walls and connecting wall beyond a predetermined extent.

2. A fuel tank for storing fuel therein, comprising:

opposed deformable thin walls; and at least one deformable connecting wall for interconnecting the thin walls to form an interior therebetween for storing fuel, the interior of the tank storing a predetermined amount of the fuel when the thin walls and the connecting wall are under a non-deformed condition thereof, wherein the thin walls deform to be curved outwardly and the connecting wall deforms to be curved inwardly when the interior of the tank stores an amount of the fuel larger than the predetermined amount and the thin walls deform to be curved inwardly and the connecting wall deforms to be curved inwardly when the interior of the tank stores an amount of the fuel smaller than the predetermined amount.

3. A fuel tank for storing fuel therein, comprising:

a pair of spaced deformable thin walls, each having a circumferential peripheral edge; and a circumferentially closed deformable band-like connecting wall extending between said peripheral edges of said thin walls over the circumference thereof, said connecting wall and said thin walls defining a fuel chamber therein, said thin walls and said connecting wall being interconnected so that said connecting wall contracts inwardly when said thin walls expand outwardly, wherein said thin walls have four side edges, and said connecting wall has four side sections connected to said side edges.

4. A fuel tank according to claim 1 or 2, wherein said thin walls deform to be curved inwardly, and said connecting wall deforms to be curved inwardly when the interior of the tank stores an amount of the fuel smaller than the predetermined amount.

5. A fuel tank according to claim 1 or 2, wherein said thin walls have polygonal shapes, respectively.

6. A fuel tank according to claim 5, wherein the shape of said fuel tank is parallelepiped.

7. A fuel tank according to claim 1 or 2, wherein said thin walls have four side edges, respectively, and said connecting wall has four side sections connected to said side edges, respectively.

8. A fuel tank according to claim 7, wherein corners of two of said side sections together with corners of one of said thin walls form a point.

9. A fuel tank according to claim 7, wherein said side sections deform to be curved inwardly simultaneously when the interior of the tank stores an amount of fuel larger than the predetermined amount.

10. A fuel tank according to claim 7, wherein said side sections have rectangular shapes, respectively.

11. A fuel tank according to claim 1 or 2, wherein said deformation preventing means comprises projections extending outwardly from said connecting wall and said projections abut against each other when said connecting wall deforms to be curve inwardly beyond said predetermined extent.

12. A fuel tank according to claim 1 or 2, wherein one of said thin walls is located above the other thin wall, said lower thin wall has an opening for introducing the fuel into said fuel chamber, and means is provided for introducing the fuel through said opening in a direction along a plane including said lower thin wall.

13. A fuel tank according to claim 1 or 2, wherein one of said thin walls is located above the other thin wall, a pipe for introducing the fuel into said fuel chamber is connected to said lower thin wall to form an angle smaller than the right angle between an axis of said pipe and a plane including said lower thin wall.

14. A fuel tank according to claim 1 or 2, wherein one of said thin walls is located above the other thin wall, and said lower thin wall has an oval opening for introducing the fuel into said fuel chamber.

15. A fuel tank according to claim 1 or 2, wherein one of said thin walls is located above the other thin wall, and said lower thin wall has a plurality of oval openings for introducing the fuel into said fuel chamber.

16. A fuel tank according to claim 1 or 2, wherein a rigidity of said connecting wall is larger than a rigidity of said thin walls.

* * * * *